United States Patent
Lin et al.

(10) Patent No.: US 7,743,265 B2
(45) Date of Patent: Jun. 22, 2010

(54) SYSTEM RESTART CIRCUIT AND SYSTEM RESTART METHOD THEREOF

(75) Inventors: Hsuan-Yu Lin, Taipei County (TW); Wei-Hao Yeh, Tai-Chung (TW)

(73) Assignee: Lite-On Technology Corp., Taipei (TW)

( * ) Notice: Subject to any disclaimer, the term of this patent is extended or adjusted under 35 U.S.C. 154(b) by 615 days.

(21) Appl. No.: 11/690,136

(22) Filed: Mar. 23, 2007

(65) Prior Publication Data

US 2008/0123233 A1 May 29, 2008

(30) Foreign Application Priority Data

Nov. 24, 2006 (TW) .............................. 95143561 A

(51) Int. Cl.
G06F 1/00 (2006.01)

(52) U.S. Cl. ...................................... 713/300

(58) Field of Classification Search ................... 713/300
See application file for complete search history.

(56) References Cited

U.S. PATENT DOCUMENTS

2006/0164767 A1* 7/2006 Liao et al. ..................... 361/23

* cited by examiner

*Primary Examiner*—Thomas Lee
*Assistant Examiner*—Mohammed H Rehman
(74) *Attorney, Agent, or Firm*—Rosenberg, Klein & Lee

(57) ABSTRACT

Disclosed are a system restart circuit and system restart method thereof. The system restart circuit includes a capacitive element, a first end of which is coupled to a first voltage level; a restart switch for coupling a second end of the capacitive element to the first voltage level selectively; a first circuit for establishing a current path between a second voltage level and the capacitive element during a restart time, and setting a voltage level of an enabling signal of a system power supplying circuit according to the voltage level of the second end of the capacitive element; and a second circuit for controlling the first circuit to continually establish the current path during the restart time. The present invention can spontaneously restart the system when a restart signal is detected, so that the hardware restart can be accomplished with low cost.

20 Claims, 7 Drawing Sheets

SYSTEM RESTART CIRCUIT AND SYSTEM RESTART METHOD THEREOF

BACKGROUND OF THE INVENTION

1. Field of the Invention

The invention relates to a system restart circuit and a system restart method thereof, and more particularly, to a spontaneous system restart circuit suitable to be implemented in a portable electronic device and a spontaneous system restart method thereof.

2. Description of the Prior Art

FIG. 1 is a diagram of a conventional power processing circuit of a portable electronic device such as a notebook, portable multimedia player, cell phone or handheld gaming device. If the microprocessor 10 crashes, a user can stop the device by pressing the restart switch 12. At this time, the BJT 14 is off and the source-to-gate voltage ($V_{SG}$) of FET 16 is lower than the turn-on voltage of the FET 16 so that the FET 16 turns off, and the current supplied from the power $V_{BAT}$ cannot flow into the system power supplying circuit 18, which causes the device to stop operating. If the user wants to restart the device, he/she must press a power on/off switch (not shown) in order to input a PW ON/OFF enabling signal from node A to turn on the BJT 14, so the FET 16 can establish a channel to conduct the current into the system power supplying circuit 18 once more. Therefore, the conventional power processing circuit of FIG. 1 cannot automatically accomplish the restart process with one restart switch.

Generally speaking, the system restart mechanism includes a hardware restart mechanism and a software restart mechanism. Because the size of a portable electronic device is expected to be small and thin, the portable electronic device is usually unable to provide a hardware restart function, and must executes the restart process by software. For example, a specific command can be preset in a handheld device, and the specific command is executed through an operating interface to restart the device if needed. However, when the software or the microprocessor of the handheld device also crashes, the specific command cannot be executed. The user can only force the device to turn off and then restart by cutting off the power supply of the device (for example, unloading the battery). This not only wastes time but also causes damage to the inner circuit of the device; in other words, it is not convenient to the user.

Additionally, a power restart circuit of a notebook shown in FIG. 2 is proposed. When the restart switch 20 is pressed, the input voltage level of the peripheral device controlling unit 22 changes, and this change will further trigger the peripheral device controlling unit 22 to transmit a power on signal to the power supplying unit 24 to restart the notebook. Therefore the user can restart the notebook by pressing the power restart circuit instead of cutting off the power of the notebook. The drawback of this circuit is its complex structure, which requires the FET 26 and the pulse width modulation (PWM) unit 28, increasing the production cost accordingly.

SUMMARY OF THE INVENTION

It is therefore one of the objectives of the present invention to provide a system restart circuit and a system restart method thereof with low cost, which could be implemented in a portable electronic device or other electronic device requiring a hardware restart mechanism to provide the hardware restart function, in order to solve the aforementioned problems.

According to an exemplary embodiment of the present invention, a system restart circuit comprises a capacitive element, a first end of which is coupled to a first voltage level; a restart switch for coupling a second end of the capacitive element to the first voltage level selectively; a first circuit, coupled to a second voltage level, the second end of the capacitive element and a system power supplying circuit, for establishing a current path between a second voltage level and the capacitive element during a restart time, and setting a voltage level of an enabling signal of the system power supplying circuit according to the voltage level of the second end of the capacitive element, wherein only when the voltage level of the enabling signal reaches a predetermined value, will the system power supplying circuit generate an output; and a second circuit, coupled to the first circuit, for controlling the first circuit to continually establish the current path during the restart time.

Moreover, according to an exemplary embodiment of the invention, a system restart method comprises: providing a capacitive element whose first end is coupled to a first voltage level; selectively coupling a second end of the capacitive element to the first voltage level to start a restart process; continually establishing a current path between a second voltage level and the capacitive element during a restart time, and setting a voltage level of an enabling signal of a system power supplying circuit according to the voltage level of the second end of the capacitive element, wherein only when the voltage level of the enabling signal reaches a predetermined value, will the system power supplying circuit generate an output.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
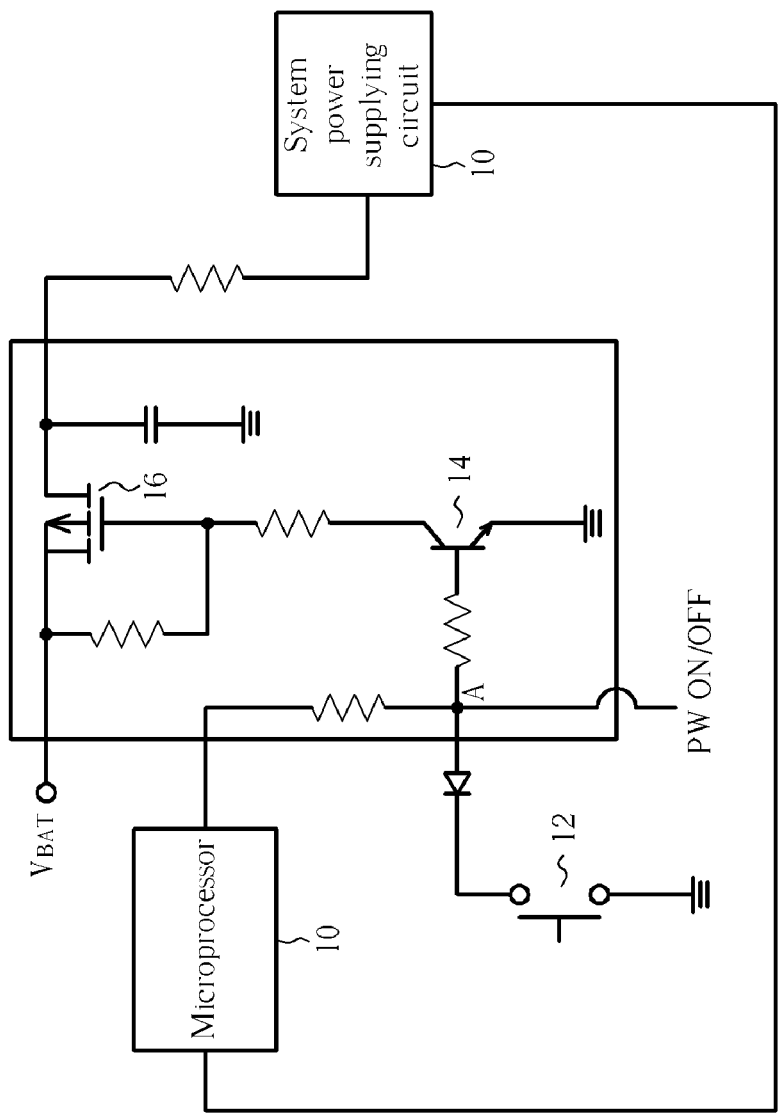
FIG. 1 is a diagram of a conventional power processing circuit of a portable electronic device.
Figure 2:
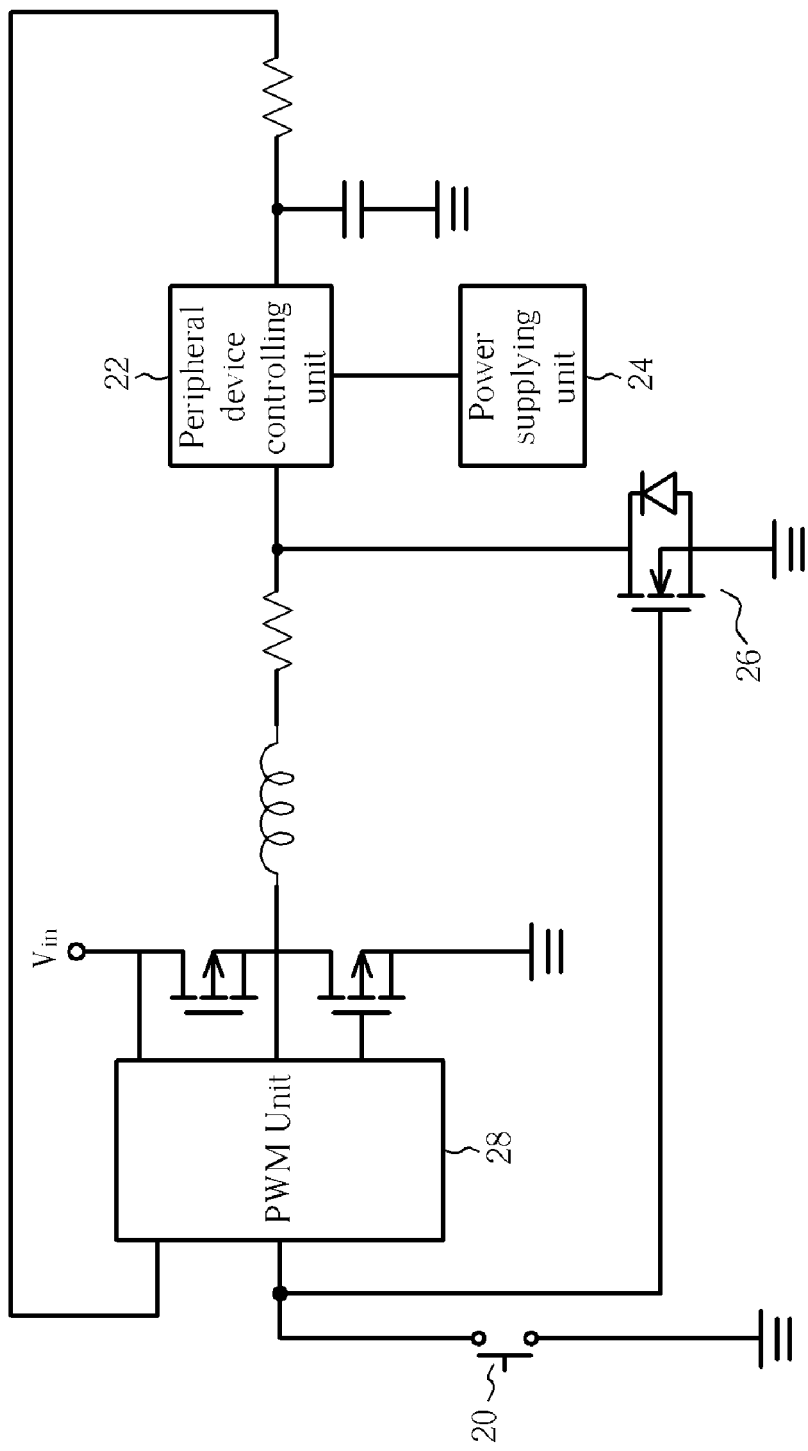
FIG. 2 is a diagram of a conventional power restart circuit of a notebook.
Figure 3:
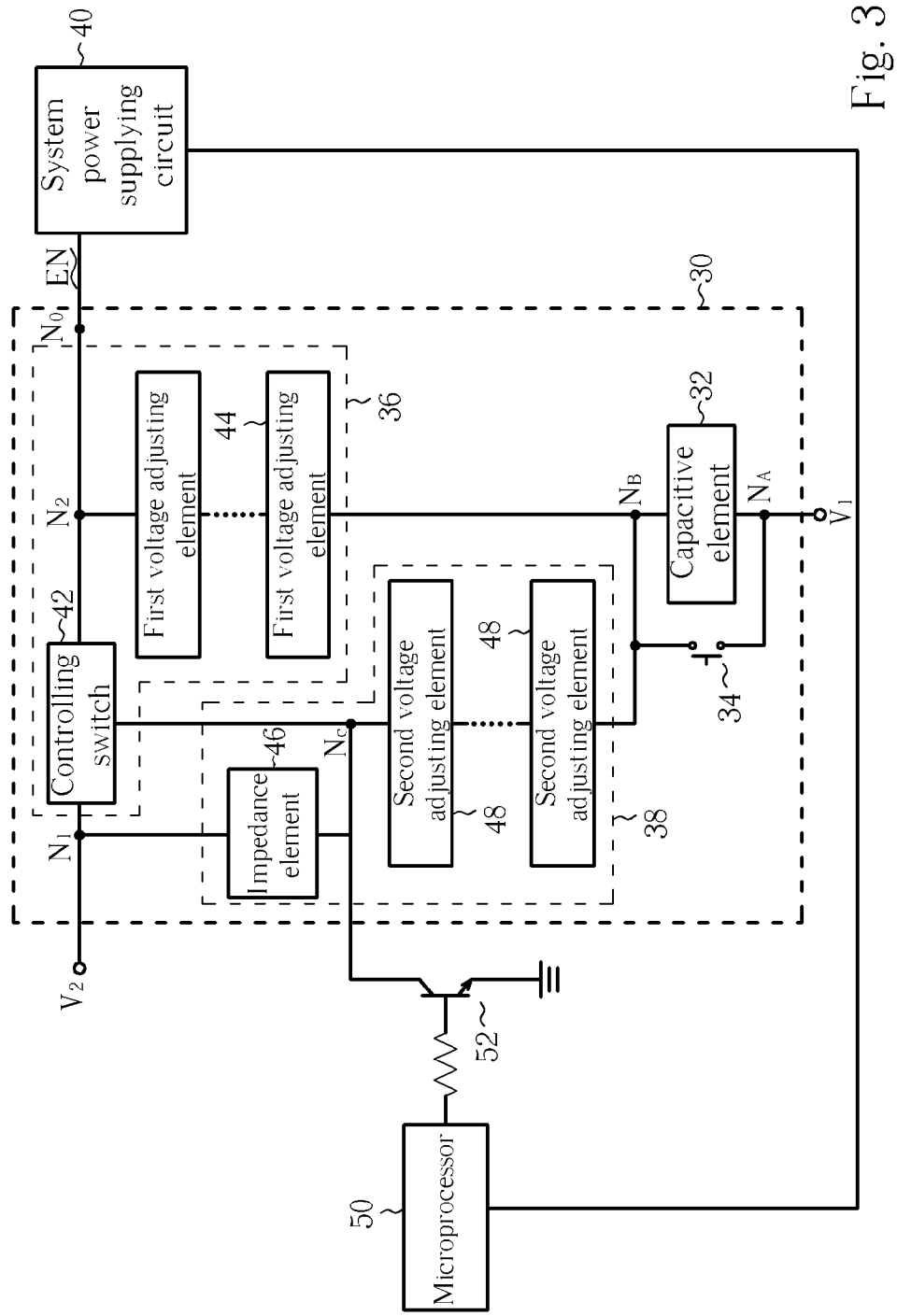
FIG. 3 is a diagram of a system restart circuit according to an exemplary embodiment of the present invention.

Please refer to FIG. 3, which is a diagram of a system restart circuit according to an exemplary embodiment of the present invention. In this embodiment, the system restart circuit 30 comprises a capacitive element 32 such as a capacitor, whose first end $N_A$ is coupled to a first voltage level $V_1$; a restart switch 34 coupled between a second end $N_B$ of the capacitive element 32 and the first voltage level $V_1$, for selectively coupling the second end $N_B$ of the capacitive element 32 to the first voltage level $V_1$; a first circuit 36, coupled to a second voltage level $V_2$, the second end $N_B$ of the capacitive element 32 and a system power supplying circuit 40; and a second circuit 38, coupled to the first circuit 36. Please note that FIG. 3 only shows the circuit elements related to the system restart circuit 30 but the omission of other non-related elements does not affect the disclosure of the present invention.

The first circuit 36 is utilized to establish a current path between the second voltage level $V_2$ and the capacitive element 32 during a restart time. In this embodiment, the first circuit 36 comprises a controlling switch 42 (e.g. a FET) and at least one first voltage adjusting element 44. The first end $N_1$ of the controlling switch 42 is coupled to the second voltage level $V_2$, such as a voltage level supplied by batteries, and the second end $N_2$ is coupled to the output end $N_O$ of the first circuit 36. The on/off status of the controlling switch 42 depends on the control voltage level at its controlling end $N_C$. The first voltage adjusting element 44 has a PN junction, for example, the first voltage adjusting element 44 is implemented by a diode. It is coupled to the output end of the first circuit 36 and the second end of the capacitive element 32, and is utilized for adjusting the voltage level of an enabling signal EN of the system power supplying circuit 40 according to the voltage level of the second end $N_B$ of the capacitive element 32. Please note that the system power supplying circuit 40 will not generate an output unless the voltage level of the enabling signal EN reaches a predetermined value. Therefore, the number of the first voltage adjusting elements 44 implemented in the first circuit 36 is based on the enabling voltage level of the system power supplying circuit 40.

Additionally, the second circuit 38 is utilized for controlling the first circuit 36 to continually establish the above-mentioned current path during the restart time. In this embodiment, the second circuit 38 comprises an impedance element 46 (e.g. a resistor), coupled between the first end $N_1$ and the controlling end $N_C$ of the controlling switch 42, and at least a second voltage adjusting element 48 having a PN junction, such as a diode, coupled between the second end $N_B$ of the capacitive element 32 and the controlling end $N_C$ of the controlling switch 42. The second voltage adjusting element 48 is utilized to adjust the controlling voltage of the controlling switch 42 based on the voltage level of the second end $N_B$ of the capacitive element 32. Therefore, the number of second voltage adjusting elements 48 is based on the turn-on voltage of the controlling switch 42.

Figure 4:
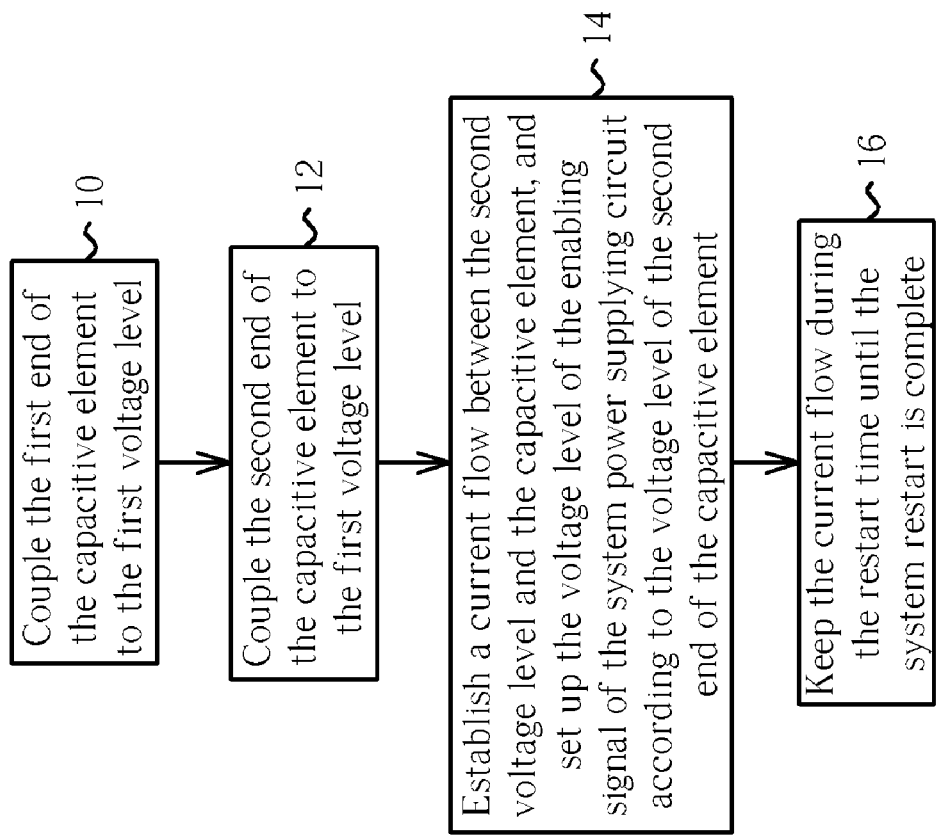
FIG. 4 is a flow chart of a system restart method according to an exemplary embodiment of the present invention.

According to the above embodiment of the system restart circuit, an exemplary embodiment of a system restart method of the present invention is illustrated by the flow chart shown in FIG. 4. First, in step 10, the first end $N_A$ of the capacitive element 32 is coupled to the first voltage level $V_1$; then the second end $N_B$ of the capacitive element 32 is coupled to the first voltage level $V_1$ by the restart switch 34 to change the voltage level of the second end $N_B$ of the capacitive element 32, and start the restart process and turn off the system power supply circuit 40 (step 12). Step 14 is for establishing a current path between the second voltage level $V_2$ and the capacitive element 32, and to set up the voltage level of the enabling signal EN of the system power supply circuit 40 according to the voltage level of the second end $N_B$ of the capacitive element 32. Next, step 16 is for continually maintaining the current path during the restart time until the system restart process is completed. Note that when the voltage level of the enabling signal EN reaches the turn-on voltage of the system power supply circuit 40, the system power supply circuit 40 will turn on again and generate an output to complete the restart process.

Figure 5:
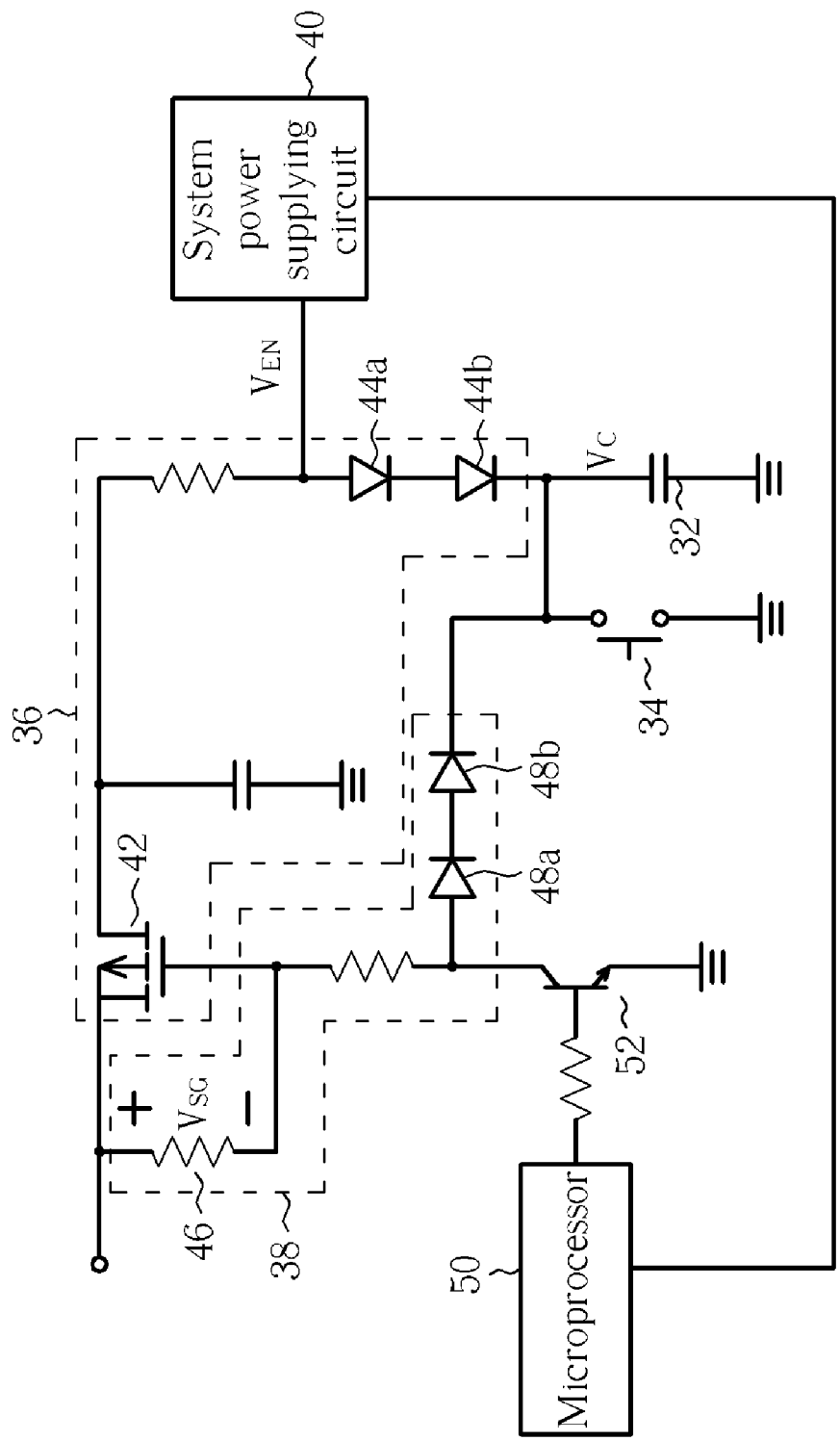
FIG. 5 is a circuit diagram of the system restart circuit shown in FIG. 3.

Please refer to FIG. 3 in conjunction with FIG. 5. FIG. 5 is a circuit diagram of the system restart circuit 30 shown in FIG. 3. In order to show the detailed operating principle and process of the present invention, the following takes the circuit shown in FIG. 5 as an example to illustrate how the system restart circuit 30 completes the hardware restart function. In FIG. 5, the first voltage level $V_1$ is a ground level, the first voltage level $V_2$ is a power $V_{BAT}$, the capacitive element 32 is a capacitor, the controlling switch 42 is an FET (i.e. a P-channel MOSFET), the impedance element 46 is implemented by a resistor, and the first voltage adjusting element 44 and the second voltage adjusting element 48 are implemented by diodes respectively. Note that the circuit configuration shown in FIG. 5 is for illustration only and is not meant to be a limitation of the present invention, that is, other configurations obeying the spirit of the invention are also feasible. For example, if the result is substantially the same, active/passive components could be removed from or added into the circuit of FIG. 5. These modified circuit configurations also fall into the scope of the present invention.

As shown in FIG. 5, in a normal stable state, the voltage level $V_{EN}$ of the enabling signal EN is close to the voltage level supplied by the power $V_{BAT}$, higher than the turn-on voltage of the system power supplying circuit 40. The voltage level $V_C$ of one end of the capacitor 32 (because the other end of the capacitor 32 is connected to ground level, the voltage of the capacitor 32 is $V_C$) is charged to $V_{BAT}-V_{D1}-V_{D2}$ by the power $V_{BAT}$, wherein $V_{D1}$ is representative of the voltage drop of the diode 44a, $V_{D2}$ is representative of the voltage drop of the diode 44b, and at this time the diodes 44a, 44b are both off. In order to keep the FET 42 turned on to allow the power $V_{BAT}$ continually power the system, the source-gate voltage $V_{SG}$ of the FET 42 must be higher than its turn-on voltage (i.e. 1.5V). The microprocessor 50, therefore, controls the BJT 52 to keep it in a saturation mode, and the voltage of the collector of the BJT 52 is about 0.2V at this moment. Therefore, the diodes 48a, 48b are still off. Please note that the capacitor 32 is equivalent to an open node in the normal stable state.

Figure 6:
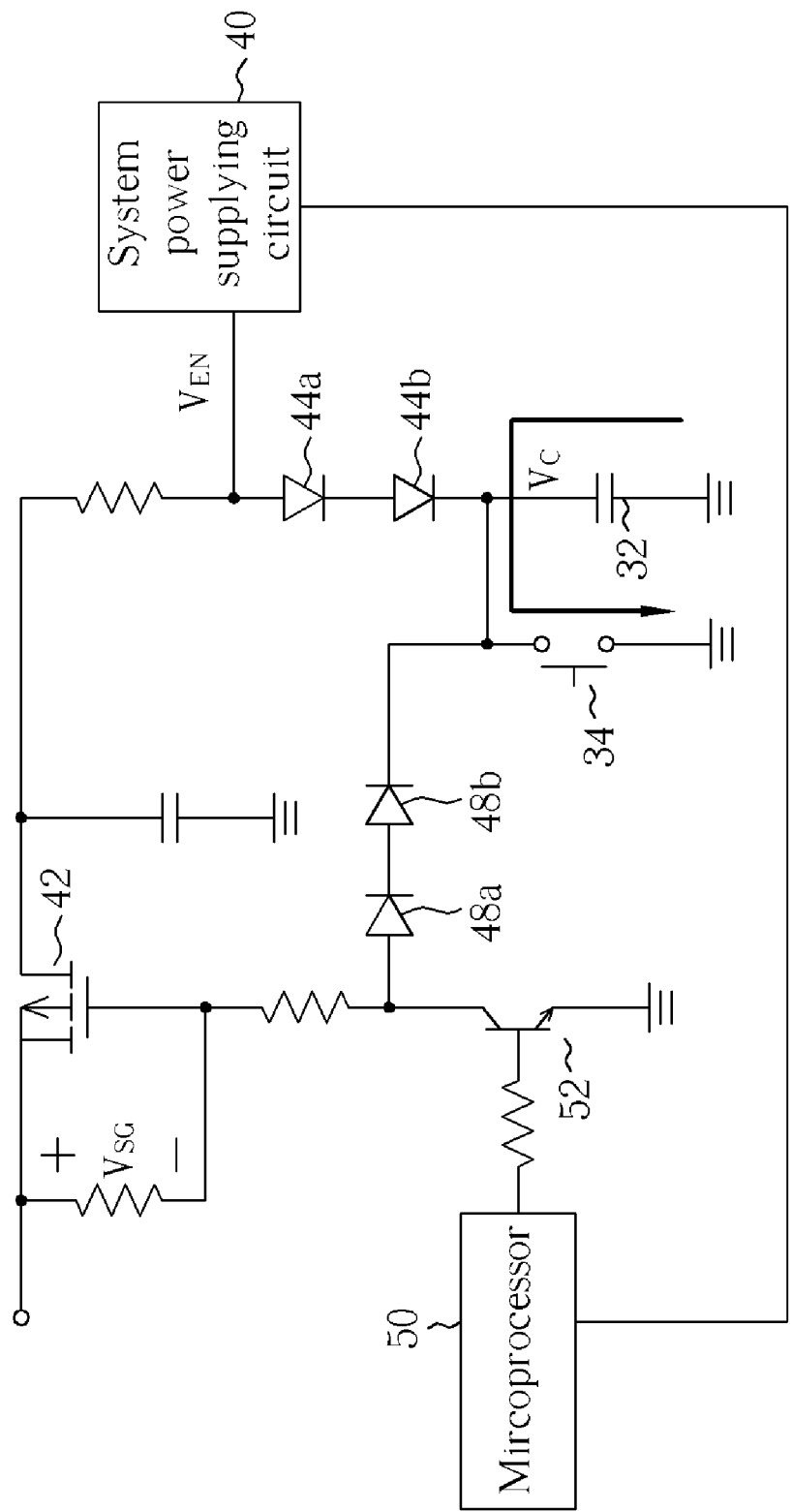
FIG. 6 is a diagram showing discharging a capacitance in the system restart circuit shown in FIG. 5 during a restart process.

When the restart switch 34 is pressed, as shown in FIG. 6, the restart switch 34 forms a discharging path and the capacitor 32 rapidly discharges as indicated by the arrowhead direction shown in FIG. 6 so that the voltage of the capacitor decreases rapidly from $V_{BAT}-V_{D1}-V_{D2}$ to 0V. At this time, the voltage level $V_{EN}$ of the enabling signal EN decreases because of the discharging of the capacitor 32. When the voltage level $V_C$ of the capacitor 32 is equal to 0V, the voltage level $V_{EN}$ of the enabling signal EN is equal to the sum of voltage drops of the diodes in the first circuit 36 (i.e. $V_{D1}+V_{D2}$). Therefore, while the sum of voltage drops of the diodes in the first circuit 36 is lower than the turn-on voltage of the system power supplying circuit 40, the system power supplying circuit 40 will be turned off at the moment when the restarted switch 34 is pressed. Consequently, the system and the microprocessor 50 will be turned off, too. The BJT 52 will enter a cut-off mode since no current flows through it. In this embodiment, the system power supplying circuit 40 is implemented by a buck converter, and its turn-on voltage is 1.5V. Since the first circuit 36 utilizes two diodes 44a and 44b, when the restart switch 34 is pressed, the voltage level $V_{EN}$ of the enabling signal EN of the system power supplying circuit 40 is $V_{D1}+V_{D2}=1.4V$, which is lower than the turn-on voltage 1.5V, causing the system power supplying circuit 40 to turn off. Please note that, in the present invention, the system power supplying circuit 40 is not limited to be implemented by a buck converter.

Figure 7:
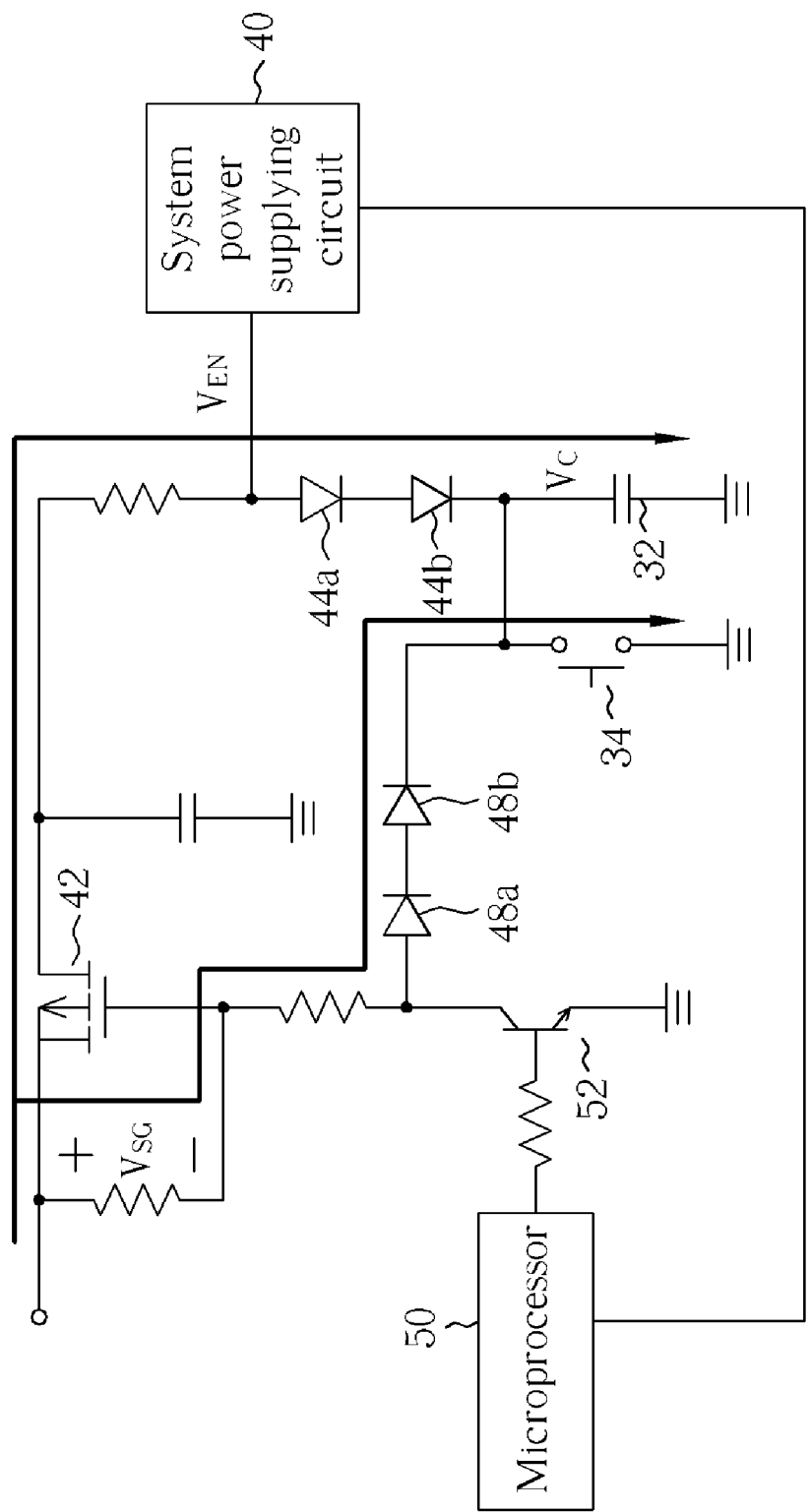
FIG. 7 is a diagram showing charging a capacitance in the system restart circuit shown in FIG. 5 during a restart process.

Next, when the user sets free the restart switch 34, because the voltage level $V_C$ of the capacitor 32 is 0V, the diodes 44a, 44b, 48a and 48b are forward-biased to conduct currents. The power $V_{BAT}$ then charges the capacitor 32 through the first circuit 36 and the second circuit 38 as indicated by the arrowhead directions shown in FIG. 7 to raise the voltage level $V_C$ of the capacitor 32. The input voltage level $V_{EN}$ of the system power supplying circuit 40 is equal to $V_{D1}+V_{D2}+V_C$, hence, as the voltage level $V_C$ of the capacitor 32 raises to 0.1 V, the voltage level of the enabling signal EN reaches the turn-on voltage of the system power supplying circuit 40 (1.5V), and makes the system power supplying circuit 40 turn on again and generate an output to restart the system. After a restart time, e.g. 200 ms, the restart operation is completed. Here, the diodes 44a, 44b are utilized for accelerating the process of the system power supplying circuit 40 from a turn-off state to a turn-on state. Because two diodes are used, the system power supplying circuit 40 can obtain enough voltage ($V_{EN}$=1.5V) for restarting when the voltage of the capacitor 32 is charged from 0V to 0.1 V. If only one diode is used, the system power supplying circuit 40 needs to wait until the voltage of the capacitor 32 is charged from 0V to 0.8V to obtain enough voltage for restarting, which prolongs the restart time of the system. However, even if only one diode is used in the circuit, this circuit configuration still falls into the scope of the present invention.

After the restart time, the microprocessor 50 controls the BJT 52 to make it conduct and remain in saturation mode once more. At this time, the collector voltage of the BJT 52 is 0.2V, and the voltage level $V_C$ of the capacitor 32 is higher than 0.2V, so the diodes 48a, 48b are cut off. Notice that the FET 42 is still on, therefore, the power $V_{BAT}$ will still charge the capacitor 32 after the restart process is completed. When the voltage level of the capacitor 32 is charged to $V_{BAT}-V_{D1}-V_{D2}$ through the first circuit 36, the diodes 44a, 44b are then cut off. Finally, the system restart circuit 30 returns to the original stable state.

Note that during the restart process, the gate voltage of the FET 42 approximately equals the sum of the voltage drops of the diodes 48a, 48b and the voltage of the capacitor 32 (i.e. $V_{D3}+V_{D4}+V_C$) when the diodes 48a, 48b in the second circuit 38 are on. Suppose the number of diodes in the second circuit 38 is appropriately chosen. Even if the system crashes and the microprocessor 50 cannot work normally to keep the BJT 52 in the saturation mode, the FET 42 can still be on during the restart time to continually provide the current path for the system by utilizing the diodes 48a, 48b to generate a low voltage level at the gate of the FET 42. This can ensure the source-gate voltage $V_{SG}$ of the FET 42 will be higher than its turn-on voltage. Taking $V_{BAT}$=3.5V for example, when the restart switch 34 is pressed, the gate voltage of the FET 42 is $V_{D3}+V_{D4}$=1.4V, and the $V_{SG}$=3.5−1.4=2.1V, which is higher than the turn-on voltage 1.5V, therefore the FET 42 remains conducting, and the charging current for the capacitor 32 is continually provided by the power $V_{BAT}$ through the first circuit 36 and the second circuit 38. If, however, the voltage of the capacitor 32 reaches $V_{BAT}-V_{SG}-V_{D3}-V_{D4}$ before the BJT 52 is turned on, the FET 42 will be turned off again. The capacitance of the capacitor 32 needs to be carefully chosen to make sure that the voltage of the capacitor 32 will not be charged to $V_{BAT}-V_{SG}-V_{D3}-V_{D4}$=0.6V during the restart time, i.e. 220 ms. The capacitance of the capacitor 32 is chosen according to a charging/discharging formula:

$$y(t) = y(\infty) + [y(t_0) - y(\infty)]e^{\frac{t-t_0}{\tau}} \quad (1)$$

wherein $\tau$ is a time constant, $y(t_0)$ is the initial voltage level equaling 0, and $y(\infty)$ is the stable voltage level equaling $V_{BAT}-V_{D3}-V_{D4}$=2.1. If $y(t_1)$=0.1 is substituted for $y(t_0)$ and $y(t_2)$=0.6 for $y(t)$ respectively, the result is $t_1$=0.336$\tau$ and $t_2$=0.05$\tau$. In order to make sure that the time for the voltage of the capacitor to be raised from 0.1 V to 0.6V is longer than the restart time 220 ms, $(t_1-t_2)$ must be greater than or equal to 250 ms, so $\tau \geq 0.874$. Therefore the capacitance C is selected to be equal to or greater than 10.53 µF. Although the capacitance calculated according to the formula (1) does not have an upper bound, a too large capacitance will lengthen the time that the capacitor 32 needs to be charged to 0.1 V to turn on the system power supplying circuit 40. Hence, a preferred choice is to use a capacitor whose capacitance is slightly larger than 10.53 µF.

In the above embodiment, the capacitor 32 is discharged from a high voltage level to a low voltage level to let the input voltage level $V_{EN}$ of the system power supplying circuit 40 be lower than its turn-on voltage level so that the system power supplying circuit 40 will be turned off. Then, the capacitor 32 is charged by the power $V_{BAT}$ to let the input voltage level $V_{EN}$ of the system power supplying circuit 40 be raised from the low voltage level to the high voltage level in order to turn on the system power supplying circuit 40 again to complete the system restart process. However, in other embodiments, assuming that the system power supplying circuit 40 works when the voltage level $V_{EN}$ of the enabling signal EN is lower than the turn-on voltage, a skilled person can readily appreciate that the present invention could also turn off the system power supplying circuit 40 when the voltage level of the capacitor 32 is charged from a low voltage level to a high voltage level, and automatically restart the system power supplying circuit 40 when the voltage level of the capacitor 32 is discharged to a voltage level lower than the turn-on voltage through a proper circuit design after reading the above disclosure. Therefore this alternative circuit design also falls into the scope of the present invention.

Compared to the prior art, the embodiment of the present invention only utilizes a plurality of diodes and one capacitor to accomplish the functions of electric isolation, restart signal detection, system shutdown, spontaneous system restart and system restart time preservation. When the system needs to be restarted, the user only needs to press the restart switch, and the system restart circuit will detect the restart signal and turn off the system. When the user sets free the restart switch, the system will be restarted spontaneously and finish the restart process after a restart time. In this way the system restart circuit can soon achieve the stable state and stop working to let the system return to the normal state. In addition, the system restart circuit will not consume extra power when the system is shut down. Since the structure of the invention is simple, it can be integrated into the original circuit without modifying the original circuit. The system restart circuit of the invention is suitable to be implemented in a portable electronic device, such as a notebook, portable multimedia player, cell phone or handheld gaming device, or other electronic devices that need a hardware restart function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system restart circuit, comprising:
    a capacitive element, a first end of which is coupled to a first voltage level;
    a restart switch, coupled to a second end of the capacitive element and the first voltage level respectively, for selectively coupling the second end of the capacitive element to the first voltage level; and
    a first circuit, coupled to a second voltage level, the second end of the capacitive element and a system power supplying circuit, for establishing a current path between the second voltage level and the capacitive element during a restart time;

wherein a voltage level of an enabling signal of the system power supplying circuit in an output node of the first circuit is set according to the voltage level of the second end of the capacitive element, and the voltage level of the second end of the capacitive element is determined by charging or discharging the capacitive element; and the system power supplying circuit will generate an output unless the voltage level of the enabling signal reaches a predetermined value.

2. The system restart circuit of claim 1, wherein the first circuit comprises:

a controlling switch, a first end of which is coupled to the second voltage level, a second end of which is coupled to the output node of the first circuit, and a controlling end of which is utilized to decide whether the controlling switch is turned on or not according to a controlling voltage; and at least a first voltage adjusting element, having a PN junction, the first voltage adjusting element being coupled to the output node of the first circuit and the second end of the capacitive element, for adjusting the voltage level of the enabling signal according to the voltage level of the second end of the capacitive element.

3. The system restart circuit of claim 2, wherein the first voltage adjusting element is a diode, and the controlling switch is a FET.

4. The system restart circuit of claim 2, wherein the first circuit comprises N first voltage adjusting elements, and N is decided according to a turn-on voltage of the system power supplying circuit.

5. The system restart circuit of claim 1, wherein the capacitive element is a capacitor, and a capacitance of the capacitor is decided according to the restart time.

6. The system restart circuit of claim 1, being implemented in a portable electronic device.

7. The system restart circuit of claim 1, being implemented in an electronic device.

8. The system restart circuit of claim 1, further comprising a second circuit, coupled to the first circuit, for controlling the first circuit to continually establish the current path during the restart time.

9. The system restart circuit of claim 8, wherein the second circuit comprises:

an impedance element, coupled to the first end and the controlling end of the controlling switch; and at least a second voltage adjusting element, having a PN junction, the second voltage adjusting element being coupled to the second end of the capacitive element and the controlling end of the controlling switch, for adjusting the controlling voltage according to the voltage level of the second end of the capacitive element.

10. The system restart circuit of claim 9, wherein the first voltage adjusting element and the second voltage adjusting element are diodes, and the controlling switch is a FET.

11. The system restart circuit of claim 9, wherein the second circuit comprises M second voltage adjusting elements, the controlling switch is an FET, and M is decided according to a turn-on voltage of the FET.

12. The system restart circuit of claim 8, wherein the second circuit comprises:

at least a second voltage adjusting element, having a PN junction, the second voltage adjusting element being coupled to the second end of the capacitive element and the first circuit, for providing a controlling voltage to the first circuit according to the voltage level of the second end of the capacitive element in order to control the first circuit to continually provide the current to the capacitive element during the restart time.

13. The system restart circuit of claim 12, wherein the second voltage adjusting element is a diode.

14. The system restart circuit of claim 1, wherein a discharging current from the capacitive element is discharged through a discharging path between the first voltage level and the capacitive element, when the restart switch is pressed, so that the voltage level of the second end of the capacitive element is decreased and the system supplying circuit will not generate the output.

15. The system restart circuit of claim 14, wherein a charging current from the capacitive element is charged through the current path between the second voltage level and the capacitive element, when the restart switch is released after the restart switch is pressed, so that and the voltage level of the second end of the capacitive element is increased and the system supplying circuit will generate the output.

16. A system restart method, comprising:

providing a capacitive element, a first end of which is coupled to a first voltage level;

selectively coupling a second end of the capacitive element to the first voltage level to discharge the capacitive element and start a restart process; and setting a voltage level of an enabling signal of a system power supplying circuit according to the voltage level of the second end of the capacitive element, and the voltage level of the second end of the capacitive element determined by charging or discharging the capacitive element;

wherein the system power supplying circuit will not generate an output unless the voltage level of the enabling signal reaches a predetermined value.

17. The system restart method of claim 16, being implemented in a portable electronic device.

18. The system restart circuit of claim 16, being implemented in an electronic device.

19. The system restart method of claim 16, wherein when coupling a second end of the capacitive element to the first voltage level, the capacitive element discharges through a discharging path and the voltage level of the second end decreases, whereby the system supplying circuit will not generate an output.

20. The system restart method of claim 19, wherein when setting the voltage level of the enabling signal, the capacitive element charging through the current path, and the voltage level of the second end of the capacitive element increases, the system supplying circuit will generate an output responsive to the voltage level of the enabling signal reaching a predetermined value.

* * * * *